(12) United States Patent
Ghislieri et al.

(10) Patent No.: US 11,787,476 B2
(45) Date of Patent: Oct. 17, 2023

(54) MOTOR VEHICLE PROVIDED WITH A RELEASE SYSTEM TO DETACH A CROSSBAR IN THE ENGINE COMPARTMENT IN THE EVENT OF A FRONTAL COLLISION

(71) Applicant: FCA ITALY S.p.A., Turin (IT)

(72) Inventors: Daniele Ghislieri, Turin (IT); Giuseppe Antonio Soddu, Turin (IT); Alessandro Messina, Turin (IT); Fabrizio Pastore, Turin (IT); Dario Viggiano, Turin (IT)

(73) Assignee: FCA ITALY S.p.A., Turin (IT)

( * ) Notice: Subject to any disclaimer, the term of this patent is extended or adjusted under 35 U.S.C. 154(b) by 352 days.

(21) Appl. No.: 17/211,167

(22) Filed: Mar. 24, 2021

(65) Prior Publication Data

US 2021/0300474 A1  Sep. 30, 2021

(30) Foreign Application Priority Data

Mar. 25, 2020 (EP) ..................... 20165689

(51) Int. Cl.
*B62D 21/15* (2006.01)
*B62D 25/08* (2006.01)
*B62D 27/06* (2006.01)

(52) U.S. Cl.
CPC ......... *B62D 21/155* (2013.01); *B62D 25/082* (2013.01); *B62D 27/065* (2013.01)

(58) Field of Classification Search
CPC .. B62D 21/155; B62D 25/082; B62D 27/065; B62D 27/00; B62D 21/11

(Continued)

(56) References Cited

U.S. PATENT DOCUMENTS 5,605,353 A * 2/1997 Moss ..................... B62D 21/09
                                                      188/376
6,029,765 A * 2/2000 Chou ..................... B60K 5/1216
                                                      180/292

(Continued)

FOREIGN PATENT DOCUMENTS

DE  102006002750 A1  9/2007
DE  102009034860 A1  4/2010

(Continued)

OTHER PUBLICATIONS

European Search Report in corresponding European Patent Application No. 20165689.9 dated Sep. 7, 2020 (11 pages).

*Primary Examiner* — Pinel E Romain (74) *Attorney, Agent, or Firm* — Harness, Dickey & Pierce, P.L.C.

(57) ABSTRACT

A motor vehicle has a passenger compartment and two side members provided with respective rear portions, arranged longitudinally at the passenger compartment, and respective struts, which project forward of the passenger compartment; the motor vehicle has a crossbar with front attachment portions and rear attachment portions fixed to the side members by means of connecting devices, so as to keep the crossbar suspended in relation to the struts; the connecting devices have at least one weakened zone, designed so as to cause at least part of the crossbar to detach from the side members when a given load threshold is exceeded; the connecting devices have a first pierced wall, which is part of the front or rear attachment portions, a second pierced wall, which is part of the side members, and a bolt that tightens the first and second wall together; the weakened zone is defined by at least one slot cut in the first wall, beginning from a hole edge of the first wall itself.

10 Claims, 6 Drawing Sheets

(58) Field of Classification Search
USPC .................................................. 296/187.09
See application file for complete search history.

(56) References Cited

U.S. PATENT DOCUMENTS

| | | | | |
|---|---|---|---|---|
| 7,407,192 | B2 * | 8/2008 | Yoshimura | B62D 21/155 |
| | | | | 280/124.109 |
| 9,428,222 | B2 * | 8/2016 | Kramer | B62D 65/00 |
| 9,493,189 | B2 * | 11/2016 | Nusier | B62D 21/11 |
| 9,616,931 | B2 * | 4/2017 | Sangha | B62D 21/11 |
| 9,944,322 | B2 * | 4/2018 | Baccouche | B62D 21/15 |
| 10,118,646 | B2 * | 11/2018 | Hilmann | B62D 21/155 |

FOREIGN PATENT DOCUMENTS

| | | | | |
|---|---|---|---|---|
| DE | 112011101139 T5 * | 1/2013 | | B60K 17/16 |
| DE | 202016104729 U1 | 1/2017 | | |
| EP | 2810854 A1 | 12/2014 | | |

* cited by examiner

MOTOR VEHICLE PROVIDED WITH A RELEASE SYSTEM TO DETACH A CROSSBAR IN THE ENGINE COMPARTMENT IN THE EVENT OF A FRONTAL COLLISION

CROSS-REFERENCE TO RELATED APPLICATIONS

This patent application claims priority from European patent application no. 20165689.9 filed on Mar. 25, 2020, the entire disclosure of which is incorporated herein by reference.

TECHNICAL FIELD

This invention relates to a motor vehicle provided with a release system to detach a crossbar in the engine compartment in the event of a frontal collision.

BACKGROUND OF THE INVENTION

As is well known, the body shell of motor vehicles is designed so as to ensure passengers' adequate safety in case of accidents. In particular, to sustain the load resulting from frontal collisions, motor vehicles are provided with longitudinal struts, with collapsible zones for absorbing energy, in the engine compartment.

Generally, the front end of a motor vehicle is supported by two main struts and by two lower struts, arranged lower down than the main struts. The rear ends of the two lower struts are connected to each other by a crossbar, which supports the front suspensions and the powertrain (defined by the motor vehicle's engine and gearbox).

In the event of frontal collisions at relatively high speeds, it's imperative that the powertrain deforms as little as possible the structure defining the passenger compartment, to avoid trauma to the legs of the motor vehicle's driver and front passenger. It is also imperative that deceleration be limited as much as possible for the passenger compartment occupants.

To satisfy these requirements, devices are provided that, in case of collision, cause the release of at least part of the crossbar from the remaining part of the body shell, so as to increase the space available for the deformation along the longitudinal direction and to move the powertrain lower down, with a consequent reduction in the risk of the powertrain encroaching on the passenger compartment. In particular, in the prior art, pyrotechnic-type devices, or coupling devices designed so as to be deformed and/or broken on reaching given stress thresholds, are provided.

In particular, the front part of the crossbar is supported by means of two side connecting members, which have corresponding boxed parts and corresponding threaded tie rod attachment devices, which are basically vertical and fix these boxed parts to the main struts. The threaded tie rod attachment devices have a weakened zone, e.g. a notch, which causes them to break or shear when stresses reach the above-mentioned stress threshold during structural deformations that occur during a frontal collision. As a result of this breaking or shearing, the crossbar detaches from the main struts and tends to slide below the floor of the vehicle. At the same time, the powertrain also detaches from the crossbar and from the main struts, thanks to other yielding elements. A solution of this type, for example, is described in the patent EP2810854.

There is a need to design the above-mentioned boxed parts differently to what is prescribed in the known solutions, in order to improve stiffness. As a direct consequence, even the type of connection to the main struts must be re-designed, so as to provide a single-sheet connection, which must be connected to the corresponding main strut by means of a simple bolt. At the same time, as described above, it is necessary to provide weakened or yielding zones that reliably enable the release of the crossbar from the remaining part of the body shell in case of a frontal collision.

In this respect, there is a need to create a solution that is constructively simple, can be implemented easily, and achieves an uniform behaviour, determinable during the design steps with a good degree of certainty and/or reliability.

SUMMARY OF THE INVENTION

The purpose of this invention is to provide a motor vehicle equipped with a release system to detach a crossbar in the engine compartment in the event of a frontal collision, which meets the above needs in a simple and economical manner.

According to this invention, a motor vehicle is provided with a release system to detach a crossbar in the engine compartment in the event of a frontal collision, as defined in claim 1.

BRIEF DESCRIPTION OF THE DRAWINGS

In order to better understand this invention, a non-limiting preferred embodiment thereof will now be described, by way of example, with reference to the attached drawings, in which.

DETAILED DESCRIPTION OF THE INVENTION

Figure 1:
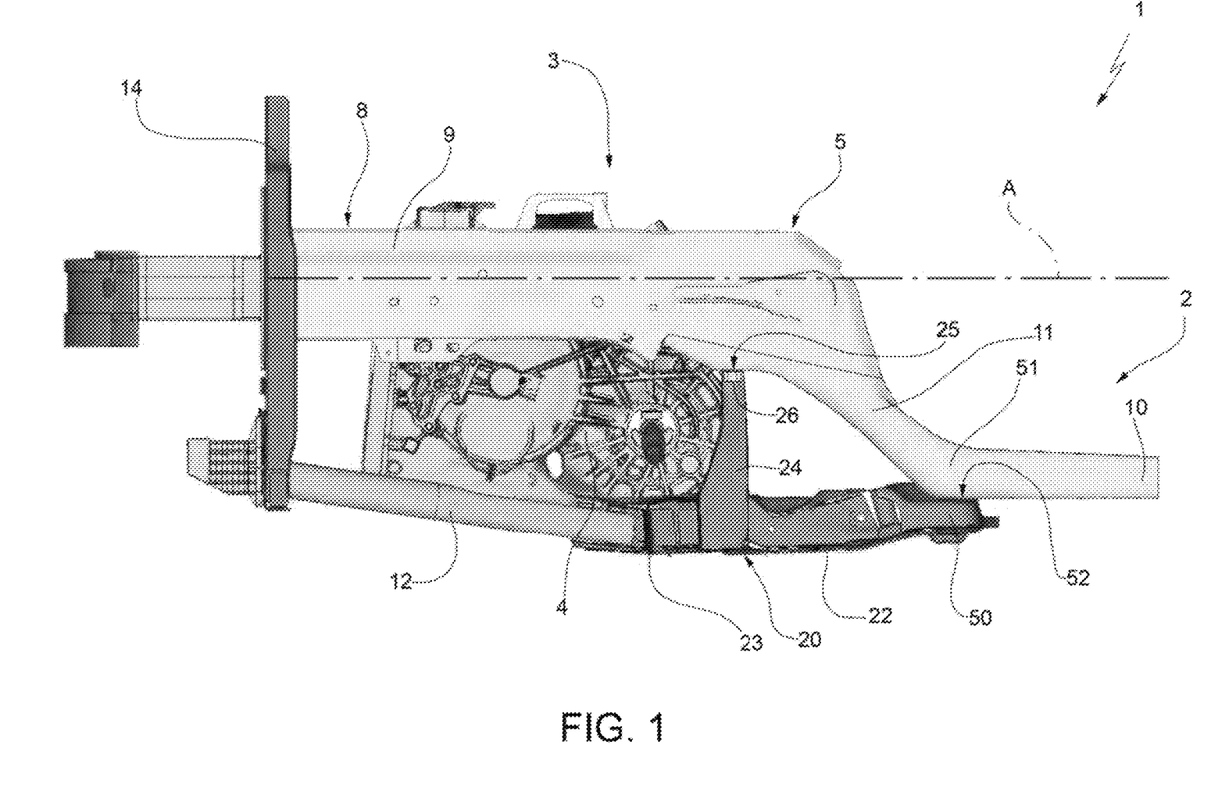
FIGS. 1 and 2 are, respectively, a side view and a perspective view from below, showing in a partial, simplified, and/or schematic way a preferred embodiment of the motor vehicle provided with a release system to detach a crossbar in the engine compartment in the event of a frontal collision, according to the present invention.

In FIG. 1, the reference number 1 indicates, as a whole, a motor vehicle (partially shown) with a passenger compartment 2 and an engine compartment 3 arranged in front of a lower zone of the passenger compartment 2 and housing a powertrain 4. In particular, the powertrain 4 is defined by the combination of an engine and a gearbox.

Figure 2:
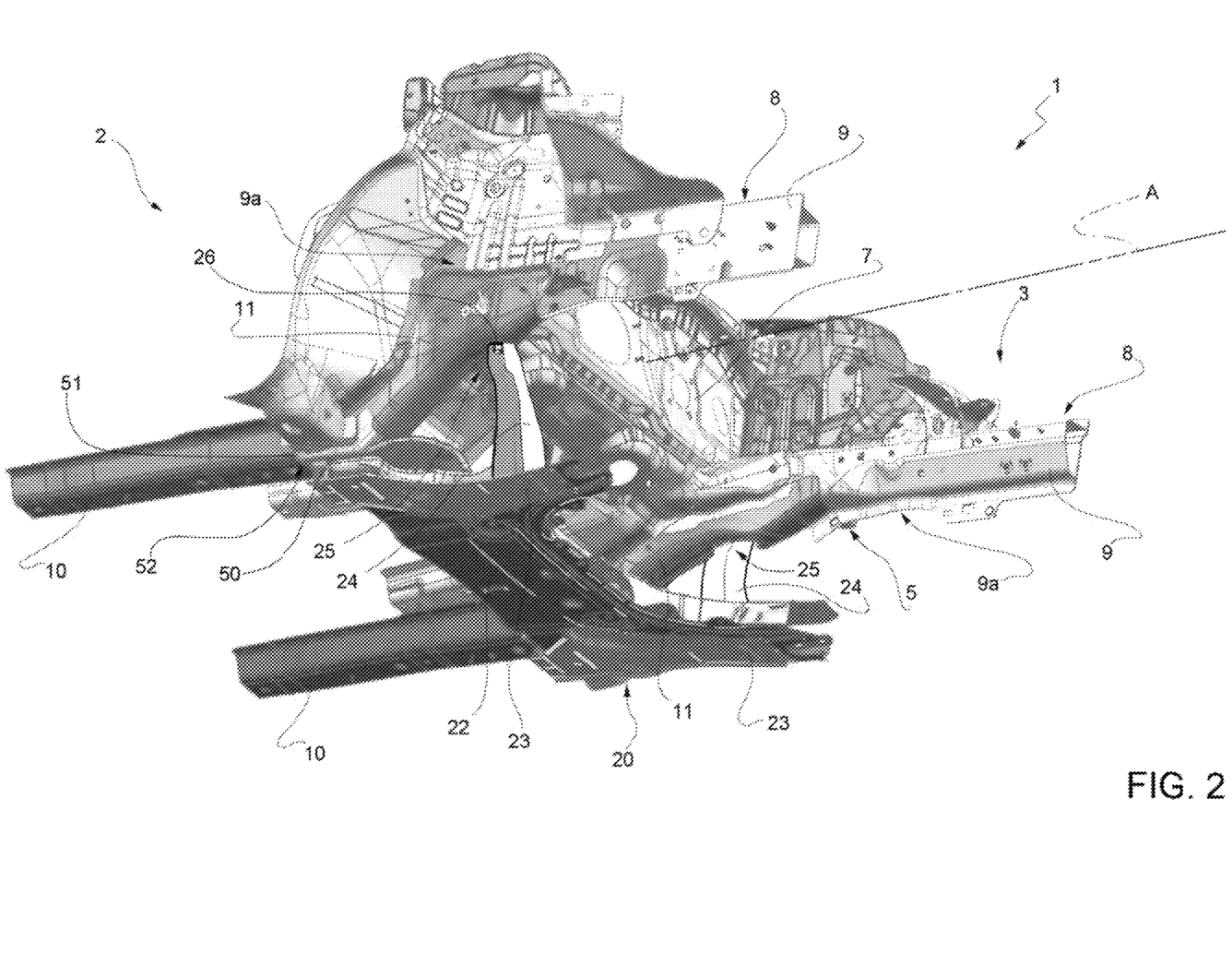

With reference to FIG. 2, the lower zone of the passenger compartment 2 is delimited, below, by a floor (not shown) and, at the front, by a basically vertical wall 7, called the "firewall". The floor and wall 7 constitute part of a body shell 5 that also comprises two side members 8. The side members 8 comprise respective front struts 9, which are basically parallel to a forward direction A of the motor vehicle 1, project forwards in relation to the wall 7, beginning from a point that is higher than the floor, and are horizontally arranged side by side with corresponding wheel arch compartments 9a that house the front wheels (not shown) of the motor vehicle 1.

The side members 8 also comprise respective rear portions 10, arranged at the floor, and respective tilted portions 11 that are arranged along the wall 7 and join the portions 10 to the struts 9.

The body shell 5 may also comprise a pair of secondary struts, not shown, that are arranged above the wheel arch compartments 9a and project forward from the front pillars that support the side doors (not shown) of the motor vehicle 1.

As can be seen in FIG. 1, the motor vehicle 1 preferably comprises two lower struts 12, which are arranged lower down than the struts 9 and are basically straight. In particular, the axes of the struts 12 have a bottom-up tilt, in a side view, and a convergent tilt from the outside to the inside, moving from the passenger compartment 2 forwards along the direction A.

The front ends of the struts 9 and 12 support a frame 14 that, in turn, supports a heat exchange assembly (not shown) and a bumper (not shown).

The rear ends of the struts 12 are fixed in a known way, not described in detail, to a crossbar 20.

With reference to FIG. 2, the crossbar 20 comprises: a transverse portion 22 that extends from one side member 8 to the other; and two arms 23, which project forwards from the side ends of the portion 22 and, considering a plan view, are basically aligned with the struts 12 and join the latter to these side ends. Considering the crossbar 20 from a side view (FIG. 1), on the other hand, the portion 22 and the arms 23 are basically coplanar and horizontal.

The crossbar 20 comprises, in addition, two connecting mounts or pillars 24 that are preferably defined by boxed elements and extends towards the top beginning from the arms 23 and/or from the side ends of the portion 22. The pillars 24 define respective front attachment points or portions, connected to the rear ends of the struts 9 and/or to the front ends of the portions 11, by means of respective connecting devices 25 that hold the crossbar 20 suspended in relation to the struts 9 of the side members 8.

Figures 3, 4:
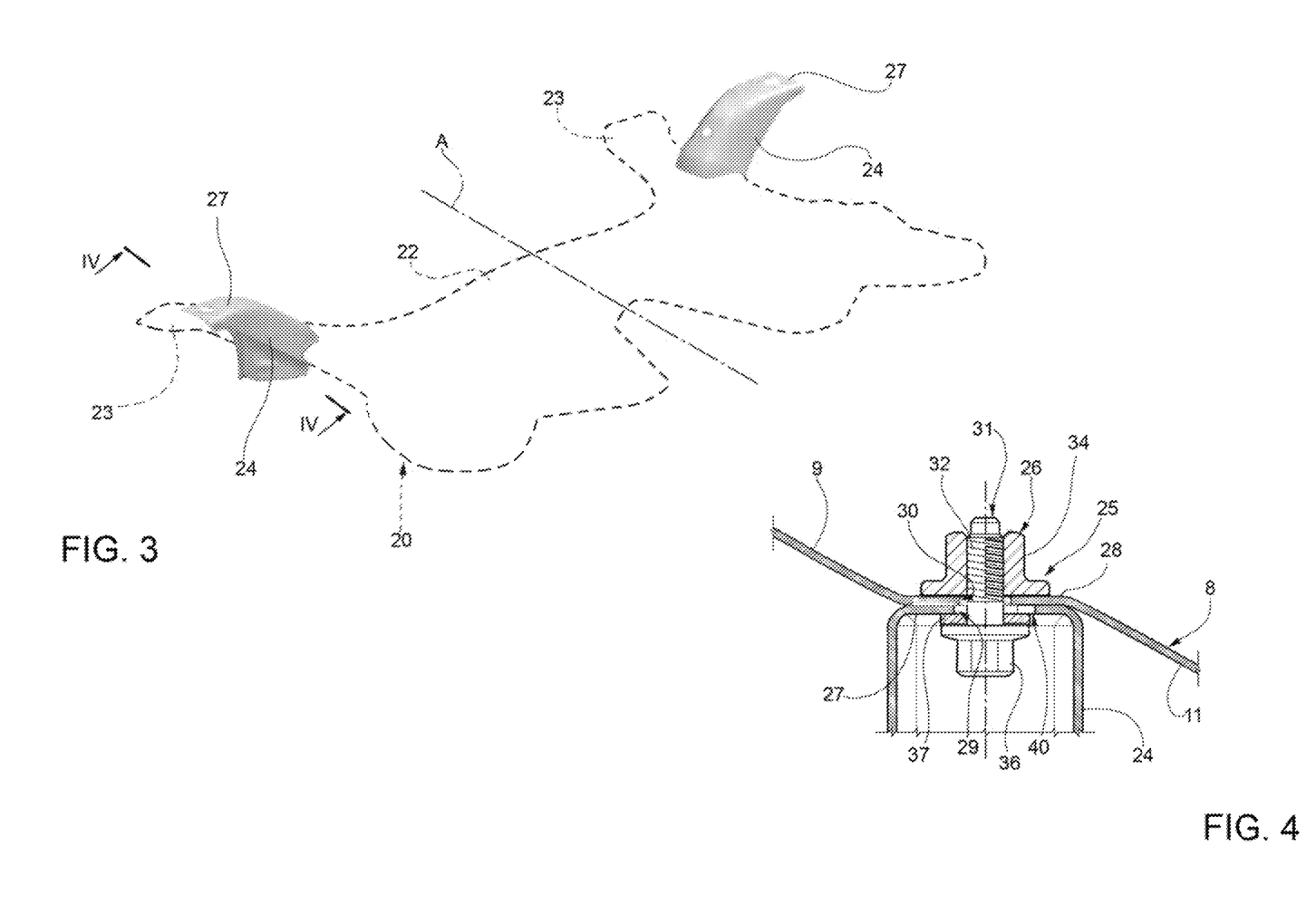
FIG. 3 is a perspective, schematised view from above of the crossbar in FIGS. 1 and 2.
FIG. 4 is a cross-section of a connecting device of the crossbar, according to a vertical section plane that is identified by the line IV-IV in FIG. 3.

With reference to FIG. 4, each connecting device 25 comprises a bolt 26, a wall 27 defining one end of the pillar 24, and a wall 28 that is part of the side member 8. The walls 27 and 28 are provided with respective holes 29 and 30, that are coaxial to each other (in a non-deformed condition). The bolt 26 comprises a screw 31 having a stem 32 that is at least in part threaded and engages the holes 29 and 30, to pass through the walls 27 and 28 respectively. The bolt 26 comprises, in addition, a nut or female screw 34, which is screwed on the stem 32 so as to axially tighten the walls 27 and 28 against each other, between the nut 34 and a head 36 of the screw 31. In addition the bolt 26 preferably comprises an anti-unscrewing element, for example a washer 37 arranged between the head 36 and the wall 27.

Figure 5A:
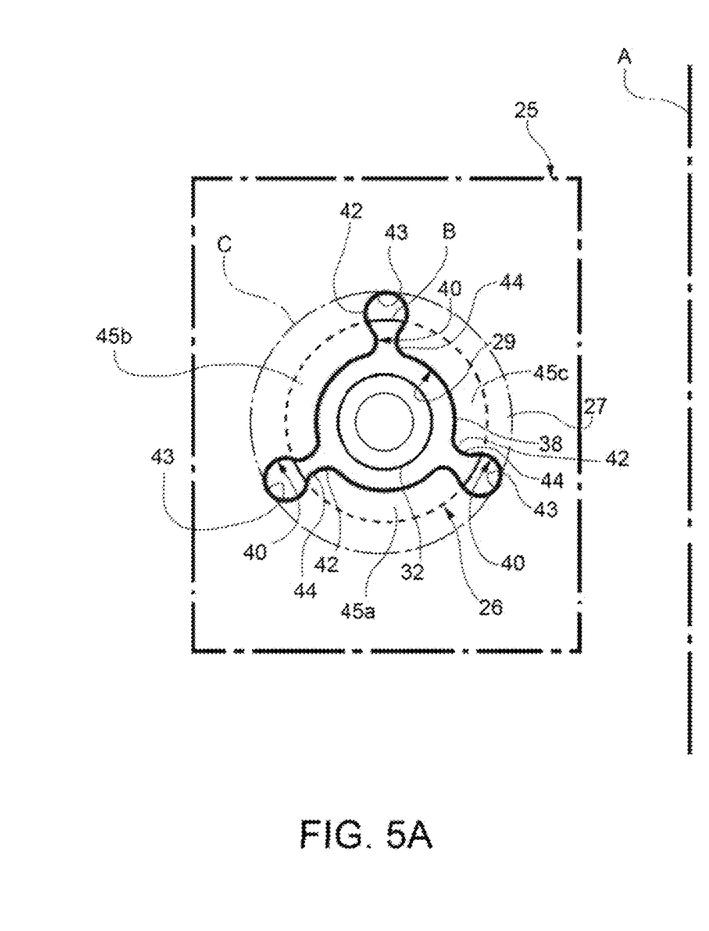
FIG. 5A shows a detail of the connecting device in FIG. 4, with parts removed for clarity.

With reference to FIG. 5A, the hole 29 has an edge 38, with a basically circular shape. According to the invention, the wall 27 has at least one slot 40 that extends beginning from the edge 38 of the hole 29, so as to locally weaken the wall 27 and, thus, encourage the crossbar 20 to detach from the side members 8 when a given stress threshold is reached, in the event of a frontal collision, as will be better described below.

In the preferred embodiment shown here, the wall 27 has three slots 40, spaced apart from each other about the axis of the hole 29 along the edge 38. One of the three slots 40 is preferably radial and parallel to the direction A and faces backwards (i.e. in the opposite direction to the direction of travel of the motor vehicle 1).

According to one variant, not shown, the wall 27 has only two slots 40.

The perimeter of each slot 40 is defined by a respective edge 42. According to one aspect of this invention, the edges 42 have no corners in order to avoid the formation of undesirable stress concentrations in the wall 27.

For the same reason, the ends of the edge 42 are joined to the edge 38 of the hole 29 by means of respective joining radii (that are relatively wide).

Again for the same reason, at the external radial end, each slot 40 ends with a zone 43 with a greater width (in the circumferential direction about the axis of the hole 29) so that the edge 42 has relatively large radii of curvature in this zone 43. For example, the shape of the zone 43 is circular.

For each slot 40, the area 43 is joined to the hole 29 by means of a radial segment 44, with a constant width (measured along the circumferential direction) that is lower than that of the zone 43.

Besides, the width of the radial segment 44 is lower than the diameter of the stem 32, i.e. lower than the fourth diameter that is mentioned below.

The slots 40 pass through the wall 27, i.e. they define respective eyelets that interrupt the continuity of the edge 38 of the hole 29. In this way, the wall 27 comprises three flaps 45a, 45b, 45c that are separated between each other by the slots 40, in the circumferential direction, and radially project towards the hole 29.

As mentioned above, the flaps 45a, 45b, 45c are axially tightened by the bolt 26 against the wall 28 of the side member 8. The bolt 26 is in contact with the wall 27 at an area B, which has a circular shape and a first diameter, while the edge 38 defines a second diameter that is lower than this first diameter. At the same time, the slots 40 can be circumscribed by an ideal circumference C, which is coaxial to the hole 29, is tangent to the zone 43 of the slots 40, and has a third diameter, which is greater than the first diameter.

In the specific case shown, the area B is defined by the washer 37; in the absence of the latter, for example, the area B is defined by the head 36 of the screw 31.

The stem 32 preferably has a fourth diameter, which is lower than the second diameter. In this way, there is a relevant radial play between the edge 38 and the stem 32 (a radial play that is greater than 1 mm, for example equal to about 3 mm): as it can be deduced from the comparison between FIGS. 5A and 5B, in the event of a frontal collision of the motor vehicle 1, first, the wall 27 tends to slide backwards parallel to the direction A, until bringing the edge 38 against the stem 32. In this operating condition (FIG. 5B), it should be noted that the flap 45a, arranged at the front with respect to the travel direction of the motor vehicle 1, remains almost entirely covered by the bolt 26 and tightened against the wall 28, while the flaps 45b and 45c, arranged at the back, remain, for the most part, uncovered by the area B of the bolt 26 and, thus, offer less resistance to the bending thereof and to the slipping out of the bolt 26 from the hole 29, during the subsequent deformation of the body shell 5.

In this regard, as it will be described below as well, during the frontal collision, the deformation of the body shell is such that it moves the crossbar 20 away from the struts 9.

Figure 6A:
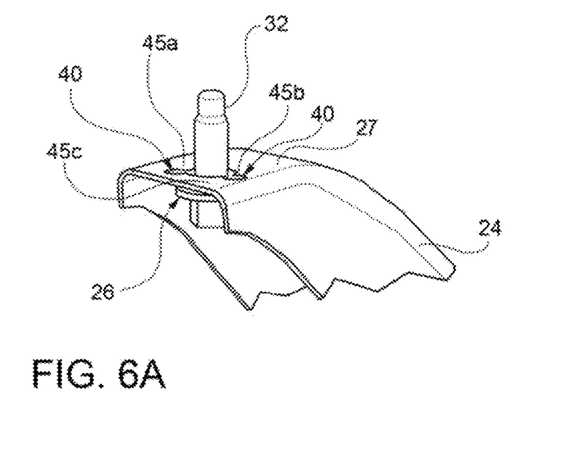
FIGS. 6A, 6B, and 6C are perspective views that show, in sequence, a deformation at the connecting device in FIG. 4, during a frontal collision.
Figures 6B, 6C:
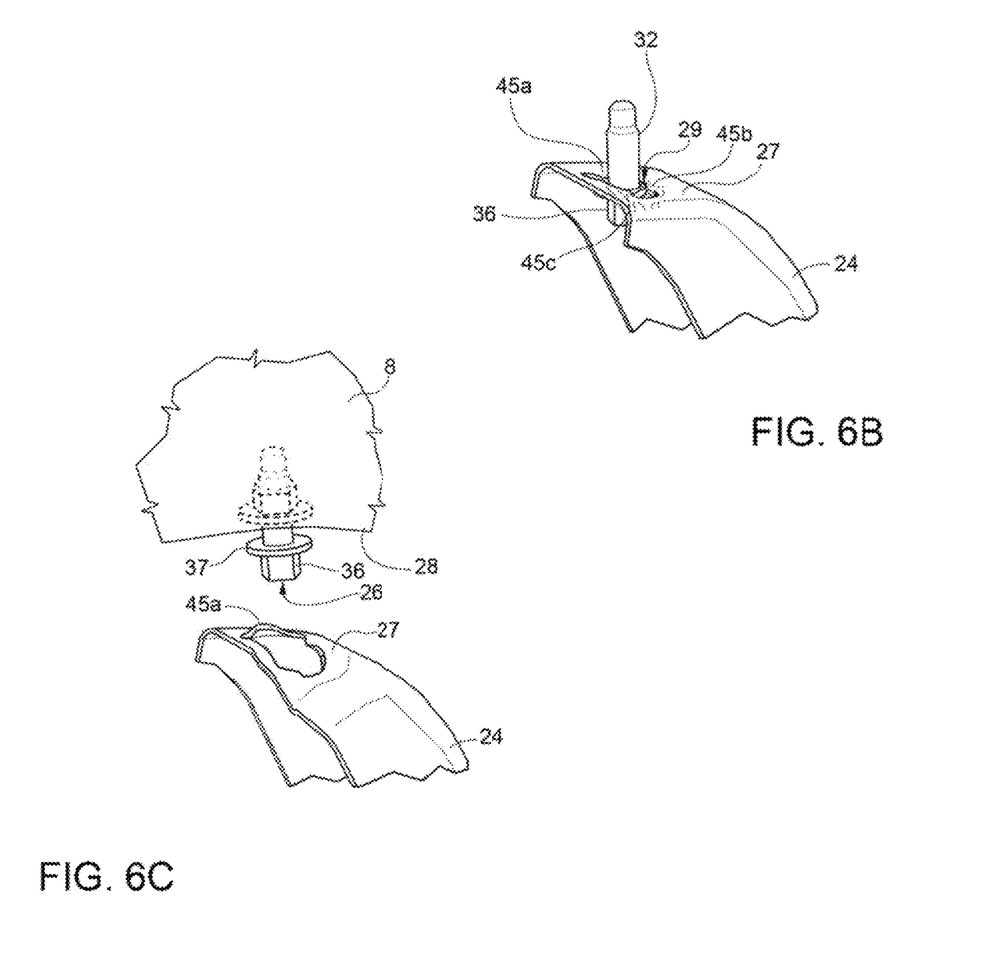

FIGS. 6A-6C show how this movement tends to detach the wall 27 from the wall 28 of the side member 8. In fact, during this movement, the bolt 26 is pulled by the wall 28 (which is thicker, or in any case stiffer, than the wall 27): the traction by the area B deforms the two rear flaps 45b and 45c, so that the head 36 and the possible washer 37 slip out of the rear zone of the hole 29 (FIG. 6B). Subsequently (FIG. 6C), the traction by the area B deforms the front flap 45a as well, so that the bolt 26 completely slips out of the hole 29.

Figure 5B:
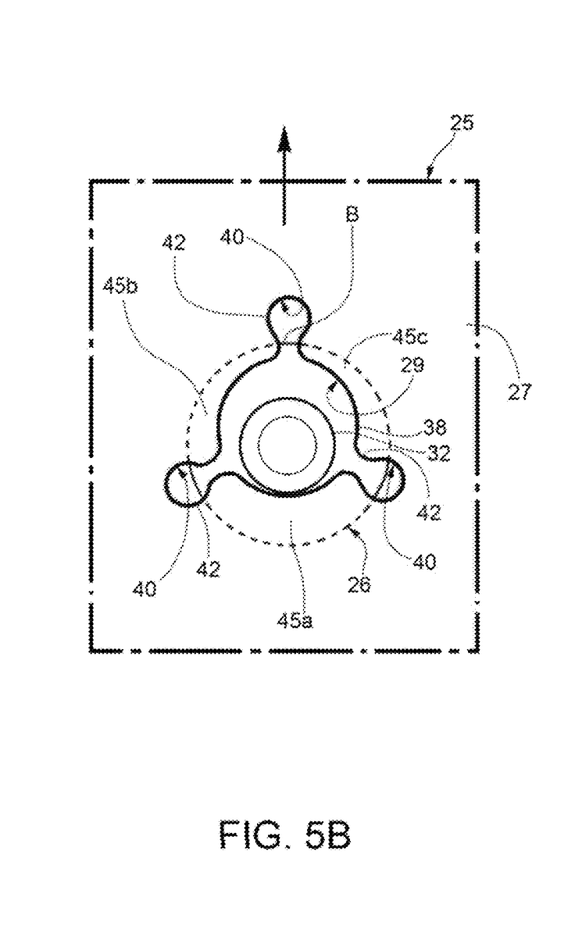
FIG. 5B is the same as FIG. 5A and shows a condition immediately following a frontal collision of the motor vehicle.

The amount of radial play between the edge 38 and the stem 32 varies the degree of coverage of the area B of the bolt 26 on the flaps 45 as it can be seen in the condition in FIG. 5B. Therefore, if appropriately calibrated, this radial play can facilitate the detachment of the bolt 26 from the wall 27. In other words, during design, it is possible to calibrate and set the values of the above-mentioned diameters (first, second, third, and fourth diameter), possibly according to the thickness of the wall 27, so as to optimise, on the one hand, the process and times for deforming the flaps 45b, 45a of the wall 27 and, thus, the slipping out of the bolt 26 from the hole 29 and, on the other hand, the necessary forces to keep the crossbar 20 coupled during normal use of the motor vehicle 1 (i.e. in the absence of collisions, in the condition that can be seen in FIG. 5A).

The above-mentioned diameters are chosen according to the specific application and to the operating conditions of the vehicle.

With reference to FIG. 1, the powertrain 4 is connected to the struts 9 and/or to the crossbar 20 by means of a plurality of supports, of a known type, not shown and not described in detail, which are of a breakable or collapsible type, or are designed so as to automatically break or disengage when a given stress threshold is exceeded in the event of an accident with a frontal collision with a relatively high impact, so as to cause the powertrain 4 to detach from the side members 8 and from the crossbar 20.

Figure 7:
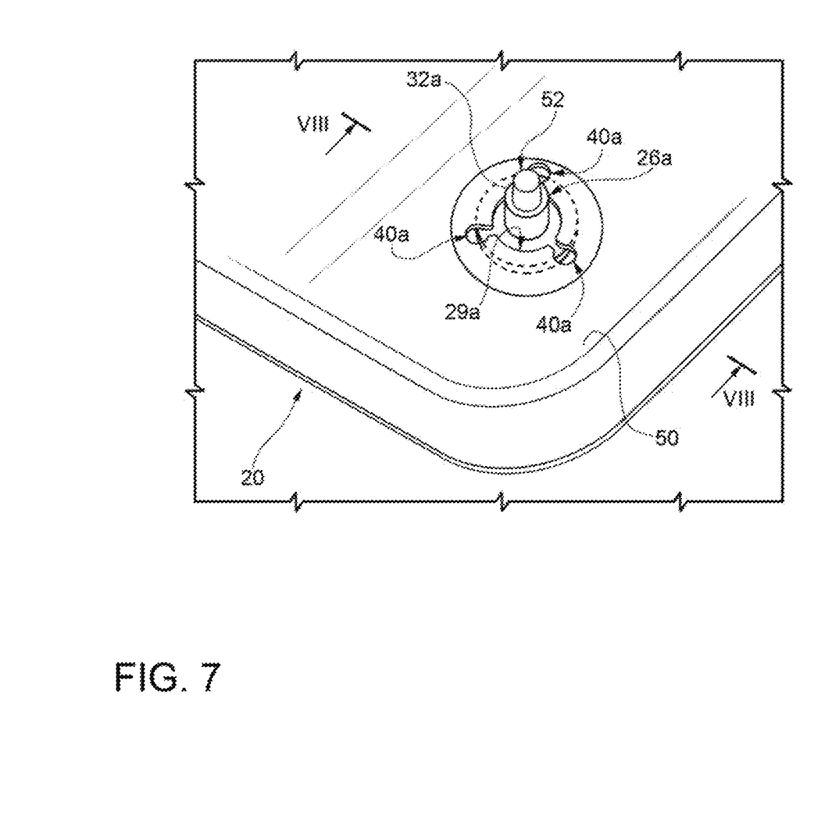
FIG. 7 is a perspective view from above of an additional detail of the crossbar in FIG. 3.

With reference to FIGS. 2 and 7, the crossbar 20 also comprises two connecting portions 50 defining respective rear attachment points that are arranged further back than the pillars 24 and are coupled to the front ends 51 of the portions 10 by means of respective connecting devices 52. For example, the portions 50 project sideways towards the outside of the portion 22, as a lengthening of the portion 22 itself.

Figure 8:
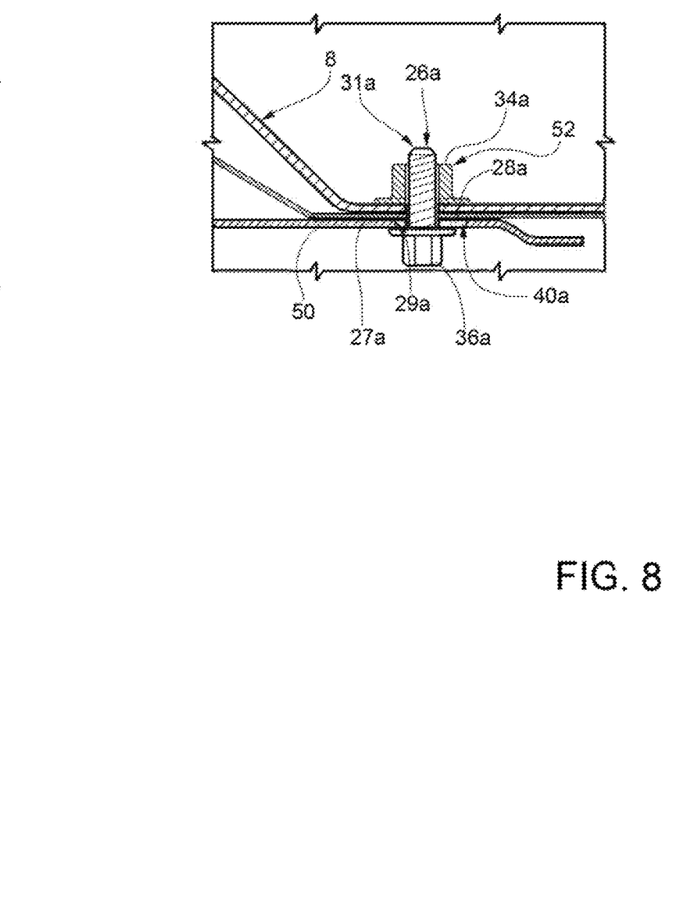
FIG. 8 is a cross-section of another connecting device of the crossbar, according to a vertical section plane that is identified by the line VIII-VIII in FIG. 7.

With reference to FIG. 8, the connecting devices 52 have the same features as the connecting devices 25 described above with reference to FIG. 4, so that the connecting device 52 components are identified with the same reference numbers as the connecting device 25, followed by the reference letter "a".

In use, in the event of a frontal collision with a relatively high impact, the longitudinal load, thanks to the collision, causes the struts 12 to bend (or, in the absence of struts 12, causes an overload via direct contact with the powertrain). This bending tends to increase the load component transmitted downwards on the arms 23 and, as a result, on the connecting devices 25. This overload causes failure of the walls 27 and disengagement of the bolts 26 from the holes 29, at the connecting devices 25, as described above with reference to FIGS. 6A-6C, and, thus, the release of the pillars 24 from the struts 9.

After this break, the load transmitted from the struts 12 (or, in the absence of struts 12, the direct contact against the powertrain) continues to push the crossbar 20 down, which, therefore, tends to rotate, basically pivoting about the ends 51 (anticlockwise in FIG. 1). As a result of this rotation, the crossbar 20 tends to move further away from the struts 9, thus freeing space for the withdrawal and the descent of the powertrain 4. At the same time, the crossbar tends to put greater stress on the connecting devices 52 until causing the walls 27a to fail and, therefore, the bolts 26a to slip out from the holes 29a, at the connecting devices 52.

In this way, the crossbar 20 completely releases from the side members 8 and, as a result, can slide below the floor of the motor vehicle 1.

At the same time, the powertrain 4 is not dragged together with the crossbar 20 but it is disengaged, in a known way not described in detail, from the crossbar 20 and from the side members 8. Following the detachment, the powertrain 4 moves according to the intensity of the collision and according to the space that is created in the engine compartment 3 during the plastic deformation of the body shell 5, independently of the movement of the crossbar 20.

In particular, the powertrain 4 has enough space to avoid collisions against the wall 7, or to avoid particular deformations in the passenger compartment 2 and particular peaks in deceleration on the occupants of the passenger compartment 2. For example, the powertrain 4 moves backwards from its original position and simply rests against the wall 7. At the same time, as explained above, the crossbar 20 is independently released from the side members 8 and moves freely, or autonomously.

It is clear, thus, that the connecting devices 25 and/or 52 enable the crossbar 20 to release from the side members 8 by means of a simple and effective solution.

In particular, this solution does not require pyrotechnic elements, but only slots 40 and/or 40a in the walls 27 and/or 27a, with the consequent advantages in terms of simplicity compared to similar prior art body shells.

Thanks to the sizing of the above-mentioned diameters associated with the connecting devices 25 and/or 52 (first, second, third, and fourth diameter) it is then possible to calibrate the process and times for deforming the walls 27 and/or 27a, as already explained above, with consequent advantages in terms of predictability and uniformity of the behaviour of the motor vehicle 1 during a collision.

Other advantages are also clear to a person skilled in the art based on the other features displayed above.

Lastly, it is clear from the foregoing that modifications and variations may be made to the motor vehicle 1 described with reference to the appended figures, while remaining within the sphere of protection of this invention, as defined in the attached claims.

In particular, the cross-section and shape of the struts 12 and/or side members 8 and/or crossbar 20 could differ from those shown as examples in the attached drawings.

In addition, the slots of this invention could be made only at the connecting devices 25 or only at the other connecting devices 52.

The invention claimed is:

1. A motor vehicle comprising:
   a passenger compartment;
   two side members comprising respective rear portions arranged longitudinally at said passenger compartment and respective struts, which project forward of said passenger compartment;
   a crossbar with front attachment portions and rear attachment portions;
   connecting devices, which fix said front and rear attachment portions to said side members in such a way as to keep said crossbar suspended in relation to said struts, and comprise at least one weakened zone designed to cause at least part of the crossbar to detach from the side members when a given load threshold is exceeded;

wherein at least one of said connecting devices comprises:

a first wall having a first hole and forming part of said front or rear attachment portions;

a second wall having a second hole and forming part of said side members;

a bolt that comprises a threaded stem through said first and second hole and that is tightened to lock said first wall against said second wall;

wherein said weakened zone comprises at least one slot cut in said first wall from an edge of said first hole;

wherein said at least one slot comprises an end zone defining a widening in relation to a remaining part of said at least one slot, said remaining part joining said end zone to said first hole;

wherein said remaining part has a width, in a circumferential direction, that is smaller than the diameter of said threaded stem and said second wall is stiffer than said first wall so that, when said given load threshold is exceeded, said bolt is pulled by said second wall, deforms two rear flaps of said first wall and slips out of a rear zone of said first hole.

2. The motor vehicle according to claim 1, wherein said at least one slot has an edge free of sharp corners.

3. The motor vehicle according to claim 1, wherein said at least one slot has an edge joined to the edge of said first hole by means of joining radii.

4. The motor vehicle according to claim 1, wherein the remaining part of said at least one slot comprises a radial segment between said first hole and said end zone.

5. The motor vehicle according to claim 1, wherein said weakened zone comprises three slots.

6. The motor vehicle according to claim 5, wherein one of said three slots faces backwards and is parallel to a longitudinal axis of the motor vehicle.

7. The motor vehicle according to claim 1, wherein:

said bolt is in contact with said first wall at an area having a first diameter;

the edge of said first hole has a second diameter, which is smaller than said first diameter;

said at least one slot is circumscribed by an ideal circumference that is coaxial to said first hole, is tangent to said at least one slot, and has a third diameter, greater than said first diameter.

8. The motor vehicle as claimed in claim 7, wherein said stem has a fourth diameter, which is smaller than the second diameter.

9. The motor vehicle according to claim 8, wherein said bolt comprises a washer defining said area.

10. The motor vehicle according to claim 7, wherein said end zone is arranged at said first diameter.

* * * * *